United States Patent
Hong et al.

(10) Patent No.: US 12,359,859 B2
(45) Date of Patent: Jul. 15, 2025

(54) WATER PURIFIER HAVING ICE-MAKER

(71) Applicant: COWAY Co., Ltd., Gongju-si (KR)

(72) Inventors: Kwang Seok Hong, Gongju-si (KR); Jung Chul Park, Gongju-si (KR); Do Han Kim, Gongju-si (KR); Seong Wook Kim, Gongju-si (KR)

(73) Assignee: COWAY Co., Ltd., Gongju-si (KR)

( * ) Notice: Subject to any disclaimer, the term of this patent is extended or adjusted under 35 U.S.C. 154(b) by 206 days.

(21) Appl. No.: 18/000,069

(22) PCT Filed: May 27, 2021

(86) PCT No.: PCT/KR2021/006615
§ 371 (c)(1),
(2) Date: Nov. 28, 2022

(87) PCT Pub. No.: WO2021/242029
PCT Pub. Date: Dec. 2, 2021

(65) Prior Publication Data
US 2023/0349618 A1    Nov. 2, 2023

(30) Foreign Application Priority Data
May 28, 2020  (KR) .................. 10-2020-0064630

(51) Int. Cl.
*F25C 5/20* (2018.01)
*F25C 1/25* (2018.01)

(52) U.S. Cl.
CPC .................. *F25C 5/20* (2018.01); *F25C 1/25* (2018.01); *B67D 2210/0001* (2013.01);
(Continued)

(58) Field of Classification Search
CPC ...... F25C 1/24; F25C 1/25; F25C 5/20; F25C 1/10; F25C 2305/022; F25C 2305/0221; C02F 1/003; F25D 2323/122
See application file for complete search history.

(56) References Cited

U.S. PATENT DOCUMENTS 3,470,709 A * 10/1969 Asakawa .................. F25C 1/06
62/347
7,007,500 B2    3/2006 Lee
(Continued)

FOREIGN PATENT DOCUMENTS

JP    2005-21 4475 A    8/2005
JP    2007-113902 A    5/2007
(Continued)

OTHER PUBLICATIONS

NPL_KR-2014-0132269, (Year: 2014).*
(Continued)

*Primary Examiner* — Frantz F Jules
*Assistant Examiner* — Martha Tadesse
(74) *Attorney, Agent, or Firm* — Oblon, McClelland, Maier & Neustadt, L.L.P.

(57) ABSTRACT

The present invention relates to a water purifier with an ice maker, and more particularly to a water purifier with an ice maker, wherein a guide member for guiding ice may stably guide ice separated while moving together with a tray member, and the guide member does not interfere with a purified water storage part even in a case where the tray member rotates such that the purifier can increase the capacity of the purified water storage part and thus can improve user convenience.

15 Claims, 12 Drawing Sheets

(52) U.S. Cl.
  CPC .... *F25C 2305/022* (2013.01); *F25C 2400/04* (2013.01); *F25C 2400/14* (2013.01); *F25C 2500/02* (2013.01)

(56) References Cited

U.S. PATENT DOCUMENTS

| | | | |
|---|---|---|---|
| 7,617,693 B2 | 11/2009 | Lee | |
| 2004/0187516 A1 | 9/2004 | Lee | |
| 2007/0089451 A1* | 4/2007 | Lee | F25C 1/12 62/352 |
| 2009/0235682 A1* | 9/2009 | Petrenko | F25D 21/08 62/449 |
| 2010/0154458 A1* | 6/2010 | Davis | F25C 1/04 62/449 |
| 2015/0128634 A1 | 5/2015 | Lee et al. | |
| 2021/0356188 A1* | 11/2021 | Lee | F25C 5/06 |

FOREIGN PATENT DOCUMENTS

| | | |
|---|---|---|
| KR | 10-0729962 B1 | 6/2007 |
| KR | 10-0988467 B1 | 10/2010 |
| KR | 10-2011-0001851 A | 1/2011 |
| KR | 10-2013-0017803 A | 2/2013 |
| KR | 10-2013-0035113 A | 4/2013 |
| KR | 10-2013-0046221 A | 5/2013 |
| KR | 10-2014-0132269 A | 11/2014 |
| KR | 10-2015-0123758 A | 11/2015 |

OTHER PUBLICATIONS

International Search Report issued Sep. 8, 2021 in PCT/KR2021/006615 filed on May 27, 2021, 3 pages.
Extended European Search Report dated Mar. 25, 2024 in corresponding European Patent Application No. 21812249.7, 8 pages.

* cited by examiner

WATER PURIFIER HAVING ICE-MAKER

CROSS-REFERENCE TO RELATED APPLICATION

This application claims priority to and the benefit of Korean Patent Application No. 10-2020-0064630, filed on May 28, 2020, the disclosure of which is incorporated herein by reference in its entirety.

TECHNICAL FIELD

The present invention relates to a water purifier with an ice maker, and more particularly to a water purifier with an ice maker, wherein a guide member for guiding ice may stably guide ice separated while moving together with a tray member, and the guide member does not interfere with a purified water storage part even in a case where the tray member rotates such that the purifier can increase the capacity of the purified water storage part and thus can improve user convenience.

BACKGROUND ART

In general, a water purifier with an ice maker filters source water such as tap water supplied from the outside to provide purified water, cold water and/or hot water to the user, and generates and provides ice by using purified water.

Such a water purifier with an ice maker typically includes a filter for filtering source water, a purified water tank for storing purified water, a cold water tank for cooling and storing purified water and an ice making unit for making ice, and may additionally include a hot water tank for heating and storing purified water.

US Patent Application Publication No. 2015-0128634 of WOONGJIN COWAY CO. LTD. discloses a conventional water purifier with an ice maker. According to such a water purifier with an ice maker, a guide member for guiding ice generated from the ice-making drip tray to be selectively supplied to the ice storage or cold water tank is disclosed, but if the rotation of the guide member is not performed at the correct time point as the guide member rotates independently while being separately provided with the ice-making drip tray, the ice may not be normally supplied to the ice storage or the cold water tank. In addition, when the guide member rotates to change the ice path according to the user's selection while the ice is being supplied from the ice-making drip tray, the supplied ice is caught between the guide member and the case such that the ice path is not changed normally, and the guide member may be damaged by the ice entrapment phenomenon. Moreover, a separate driving motor is required to rotate the guide member, which increases power consumption during the operation of a water purifier with an ice maker and increases the total weight of a water purifier with an ice maker.

According to the water purifier with an ice maker disclosed in Korean Patent Application No. 10-2015-0123758 of Coway Co., Ltd., the configuration of a guide grill for guiding the separated ice which is directly connected to the ice-making drip tray and moves together with the ice-making drip tray is disclosed. That is, when the ice-making drip tray rotates to the ice discharging position, the guide grill is fixed thereto and is configured to guide the separated ice while rotating together, but when the guide grill is fixed to the ice-making drip tray in this way, if the ice-making drip tray rotates to the ice generating position, the guide grill is vertically disposed in the height direction, thereby causing interference with the purified water tank, and as a result, it becomes difficult to increase the capacity of the purified water tank.

The water purifier with an ice maker disclosed in Korean Patent Application No. 10-2013-0035113 of LG Electronics Co., Ltd. is provided with an ice guide for guiding the separated ice such that the ice is evenly dispersed. However, as a driving motor is provided to rotate about the driving shaft while such an ice guide is provided separately from the ice maker, there are problems in that power consumption increases during the operation of the water purifier with an ice maker, and when the ice guide does not rotate normally due to a malfunction of the driving motor, it becomes difficult to disperse the ice, and also, the total weight of the water purifier with an ice maker increases as the driving motor is provided.

RELATED ART DOCUMENTS

Patent Documents

US Patent Application Publication No. 2015-0128634
Korean Patent Application No. 10-2015-0123758
Korean Patent Application No. 10-2013-0035113

DISCLOSURE

Technical Problem

In order to solve the above problems, the water purifier with an ice maker according to the present invention is directed to improving user convenience by configuring such that the guide member for guiding the separated ice moves together with the tray member, but the guide member does not interfere with the purified water storage part even when the tray member rotates to the ice generating position, so as to enable an increase in the capacity of the purified water storage part.

The water purifier with an ice maker according to an exemplary embodiment of the present invention is directed to improving the operational stability and power consumption efficiency of the water purifier with an ice maker by stably rotating the guide member even when a separate power source is not provided by allowing the guide member to rotate by gravity.

The water purifier with an ice maker according to an exemplary embodiment of the present invention is directed to improving the ice supply stability by seating the guide member at an upper end of the sidewall member of the ice storage part when the tray member rotates to the ice discharging position because the other side of the guide member is disposed on the inner side in the width direction of the ice storage part.

The water purifier with an ice maker according to an exemplary embodiment of the present invention is directed to further improving the ice supply stability by allowing the guide member to be stably seated on the upper end of the sidewall member of the ice storage part when the ice is discharged even if the guide member is deformed during use.

The water purifier with an ice maker according to an exemplary embodiment of the present invention is directed to increasing the degree of dispersion of ice in the ice storage part by ensuring a sufficient separation distance from the guide member even when the screw member of the ice storage part is inclined along the height direction.

The water purifier with an ice maker according to an exemplary embodiment of the present invention is to directed to improving the cleanliness of the guide member by separating the guide member from the tray member to enable washing separately.

The water purifier with an ice maker according to an exemplary embodiment of the present invention is directed to improving the noise reduction effect through a buffer member by providing a buffer member which is capable of reducing ice falling noise on the guide member.

Technical Solution

In order to achieve the above objects, the water purifier with an ice maker according to the present invention includes a filtration part for filtering source water to produce purified water; a purified water storage part for storing purified water supplied from the filtration part; a cold water generation part for generating cold water by receiving purified water from the filtration part or the purified water storage part; a cold water storage part for storing cold water supplied from the cold water generation part; an ice generation part provided with a body member which is supplied with a low-temperature refrigerant to generate ice by receiving ice-making water, a finger member which is formed to extend from the body member, a tray member which accommodates purified water in which the finger member is immersed, and a guide member which is connected to the tray member and guides generated ice; and an ice storage part for storing ice supplied from the ice generating part, wherein the tray member rotates between a first position where ice-making water is accommodated to generate ice and a second position where the generated ice is separated, wherein the guide member connects the tray member and the ice storage part to guide the generated ice to the ice storage part when the tray member is positioned at the second position, and wherein when the tray member rotates in one direction to move from the second position to the first position, the guide member rotates in the other direction such that the uppermost height of the guide member is arranged to be formed to be equal to or lower than the uppermost height of the tray member.

In the water purifier with an ice maker according to an exemplary embodiment of the present invention, a first angle formed between the tray member and the guide member when the tray member is positioned at the first position is formed to be smaller than a second angle formed between the tray member and the guide member when the tray member is positioned at the second position.

In the water purifier with an ice maker according to an exemplary embodiment of the present invention, when the tray member rotates in the one direction, the guide member rotates in the other direction by gravity.

In the water purifier with an ice maker according to an exemplary embodiment of the present invention, the ice storage part is provided with a sidewall member for preventing the supplied ice from escaping, and wherein when the tray member is positioned at the second position, one side of the guide member is connected to the tray member, and the other side of the guide member is seated on the upper end of the sidewall member.

In the water purifier with an ice maker according to an exemplary embodiment of the present invention, when the tray member is positioned at the first position, the other side of the guide member is disposed on the inner side in the width direction of the ice storage part rather than an extension line of the sidewall member.

In the water purifier with an ice maker according to an exemplary embodiment of the present invention, the tray member is formed with a base, a first sidewall which extends upward from the base so as to accommodate ice-making water and is connected to the guide member, and a second sidewall which is disposed to face the first sidewall, wherein an auxiliary sidewall to which one side of the guide member is connected is formed to extend upward on the first sidewall, and wherein a first slope toward the inner side in the width direction of the ice storage part is formed on the auxiliary sidewall.

In the water purifier with an ice maker according to an exemplary embodiment of the present invention, the tray member is formed with a base, a first sidewall which extends upward from the base so as to accommodate ice-making water and is connected to the guide member, and a second sidewall which is disposed to face the first sidewall, wherein an auxiliary sidewall to which one side of the guide member is connected is formed to extend upward on the first sidewall, and wherein a supporting sidewall for supporting the guide member is formed on an outer peripheral surface of the first sidewall such that a second slope toward the inner side in the width direction of the ice storage part is formed on the guide member when the tray member is positioned at the first position.

In the water purifier with an ice maker according to an exemplary embodiment of the present invention, the supporting sidewall is formed to extend along the inner side in the width direction of the ice storage part, and is formed in plurality along the extension direction of the first sidewall.

In the water purifier with an ice maker according to an exemplary embodiment of the present invention, the supporting sidewall includes a first supporting sidewall formed at an upper part and a second supporting sidewall formed at a lower part, and wherein the second supporting sidewall is formed to extend longer than the first supporting sidewall.

In the water purifier with an ice maker according to an exemplary embodiment of the present invention, a rail member is formed to extend along an extension line of the sidewall member in the ice storage part, and wherein a support protrusion is formed on the guide member to support such that the other side of the guide member is disposed on the inner side in the width direction of the ice storage part rather than the extension line of the sidewall member when the tray member is positioned at the first position.

In the water purifier with an ice maker according to an exemplary embodiment of the present invention, an auxiliary support surface extending to be disposed on the inner side in the width direction of the ice storage part rather than the sidewall member is formed on the other side of the guide member when the tray member is positioned at the second position.

In the water purifier with an ice maker according to an exemplary embodiment of the present invention, the ice storage part is provided with a screw member for moving the stored ice, wherein the screw member has a front end higher than a rear end, and wherein an ice moving groove is formed on the auxiliary support surface at a position adjacent to the front end of the screw member.

In the water purifier with an ice maker according to an exemplary embodiment of the present invention, a hinge shaft is formed on one side of the guide member, and a coupling protrusion having an insertion groove for inserting the hinge shaft is formed on the tray member, and wherein a separation slit is formed in the coupling protrusion to enable separation of the hinge shaft.

In the water purifier with an ice maker according to an exemplary embodiment of the present invention, an overlap surface is formed on one side of the guide member such that the guide member and the tray member overlap each other when the tray member is positioned at the second position.

In the water purifier with an ice maker according to an exemplary embodiment of the present invention, the guide member is provided with a buffer member for reducing the impact of falling ice.

In the water purifier with an ice maker according to an exemplary embodiment of the present invention, a first discharge hole and a second discharge hole through which the remaining ice-making water is discharged are formed in the guide member and the buffer member, respectively, and wherein the first discharge hole is formed to be larger than the second discharge hole.

Advantageous Effects

According to the above configuration, the water purifier with an ice maker according to the present invention provides an effect of improving user convenience by configuring such that the guide member for guiding the separated ice moves together with the tray member, but the guide member does not interfere with the purified water storage part even when the tray member rotates to the ice generating position, so as to enable an increase in the capacity of the purified water storage part.

The water purifier with an ice maker according to an exemplary embodiment of the present invention provides an effect of improving the operational stability and power consumption efficiency of the water purifier with an ice maker by stably rotating the guide member even when a separate power source is not provided by allowing the guide member to rotate by gravity.

The water purifier with an ice maker according to an exemplary embodiment of the present invention provides an effect of improving the ice supply stability by seating the guide member at an upper end of the sidewall member of the ice storage part when the tray member rotates to the ice discharging position because the other side of the guide member is disposed on the inner side in the width direction of the ice storage part.

The water purifier with an ice maker according to an exemplary embodiment of the present invention provides an effect of further improving the ice supply stability by allowing the guide member to be stably seated on the upper end of the sidewall member of the ice storage part when the ice is discharged even if the guide member is deformed during use.

The water purifier with an ice maker according to an exemplary embodiment of the present invention provides an effect of increasing the degree of dispersion of ice in the ice storage part by ensuring a sufficient separation distance from the guide member even when the screw member of the ice storage part is inclined along the height direction.

The water purifier with an ice maker according to an exemplary embodiment of the present invention provides an effect of improving the cleanliness of the guide member by separating the guide member from the tray member to enable washing separately.

The water purifier with an ice maker according to an exemplary embodiment of the present invention provides an effect of improving the noise reduction effect through a buffer member by providing a buffer member which is capable of reducing ice falling noise on the guide member.

MODES OF THE INVENTION

Figure 1:
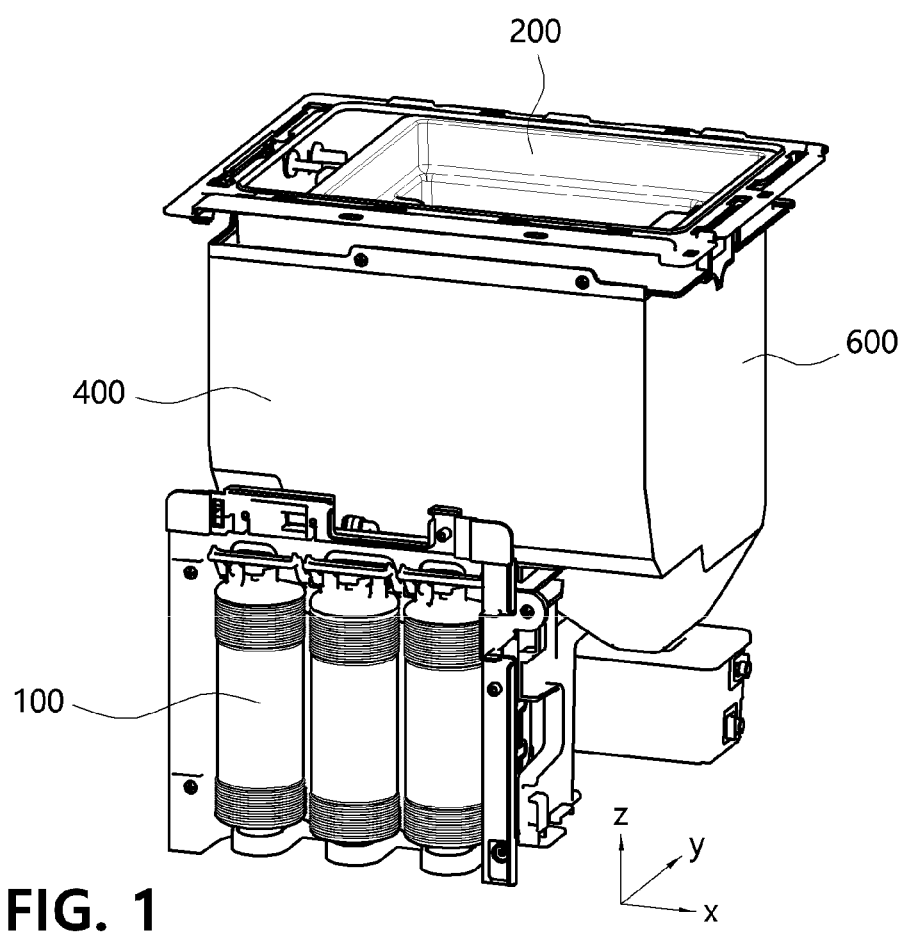
FIG. 1 is a perspective view illustrating the water purifier with an ice maker according to an exemplary embodiment of the present invention as viewed from one direction.

Words and terms used in the present specification and claims are not limited and interpreted to the conventional or dictionary meanings, and in accordance with the principle that the inventors may define terms and concepts in order to describe their invention in the best way, these should be interpreted as meanings and concepts consistent with the technical spirit of the present invention.

Since the exemplary embodiment described in the present specification and the configuration illustrated in the drawings correspond to a preferred exemplary embodiment of the present invention and do not represent all of the technical spirit of the present invention, the corresponding configuration may have various equivalents and modifications to replace the same at the time of filing of the present invention.

In the present specification, terms such as "include" or "have" are intended to describe the presence of features, numbers, steps, operations, components, parts or a combination thereof described in the specification, but it is to be understood that it does not preclude the possibility of the presence or addition of one or more other features, numbers, steps, operations, components, parts or a combination thereof.

That a component is at the "front", "rear", "above" or "below" of another component not only includes cases where, unless otherwise specified, it is in direct contact with another component and is disposed at the "front", "rear", "above" or "below", but also cases where other components are placed in the middle. In addition, that a component is "connected" with another component includes cases where, unless otherwise specified, it is in direct contact with each other, but also cases where it is indirectly connected to each other.

Figure 2:
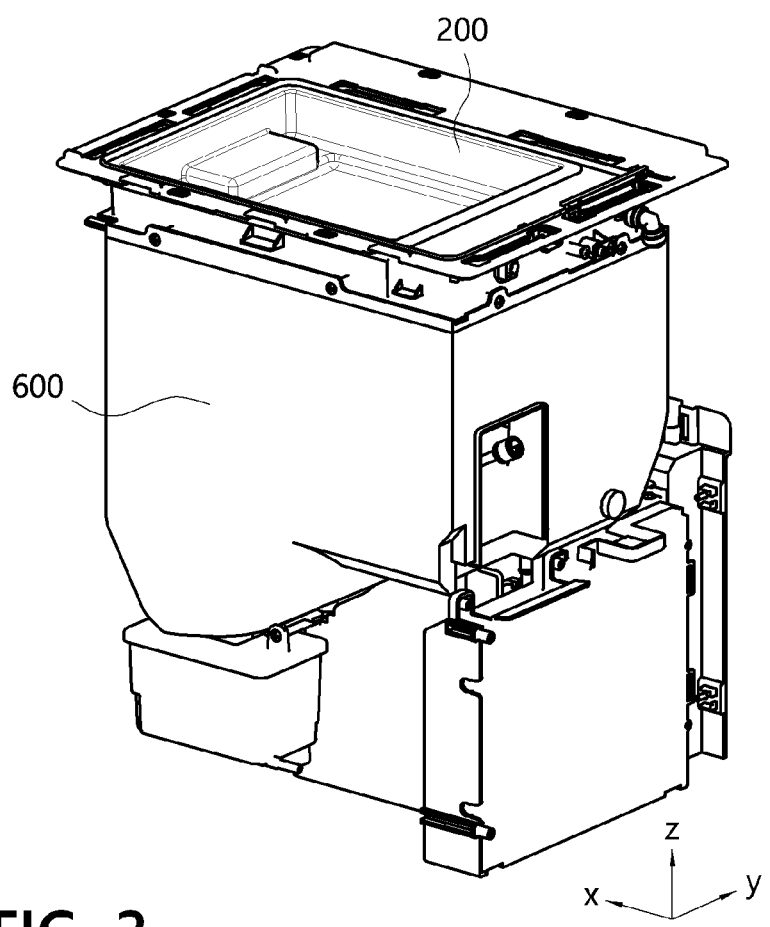
FIG. 2 is a perspective view illustrating the water purifier with an ice maker according to an exemplary embodiment of the present invention as viewed from another direction.
Figure 3:
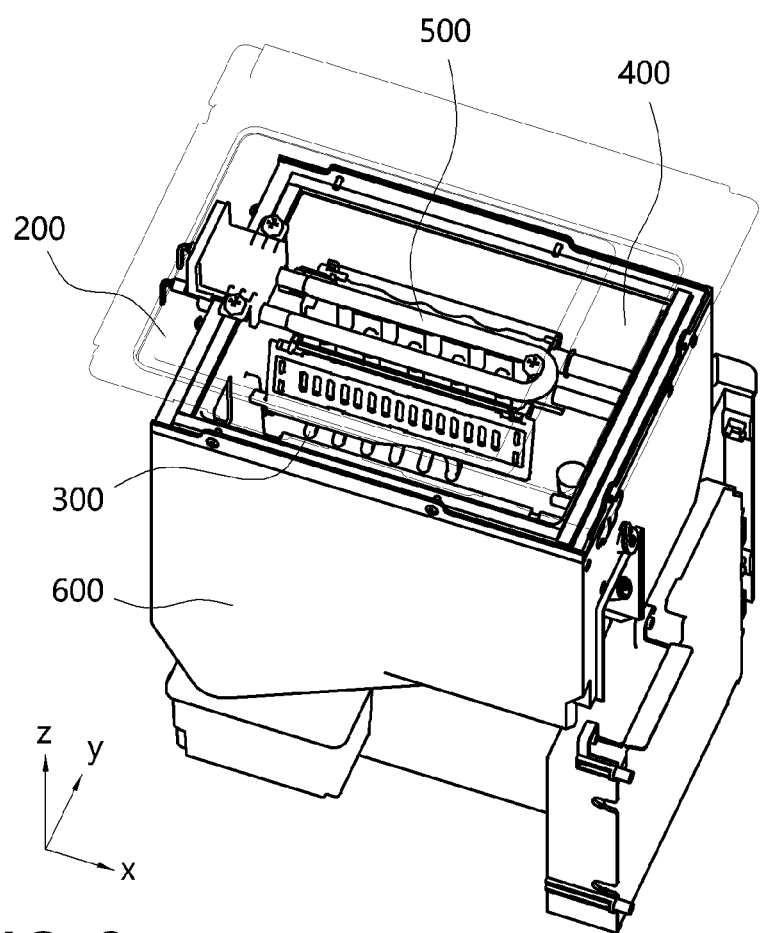
FIG. 3 is a perspective view illustrating a state in which an ice generation part is mounted on the water purifier with an ice maker according to an exemplary embodiment of the present invention.
Figure 4:
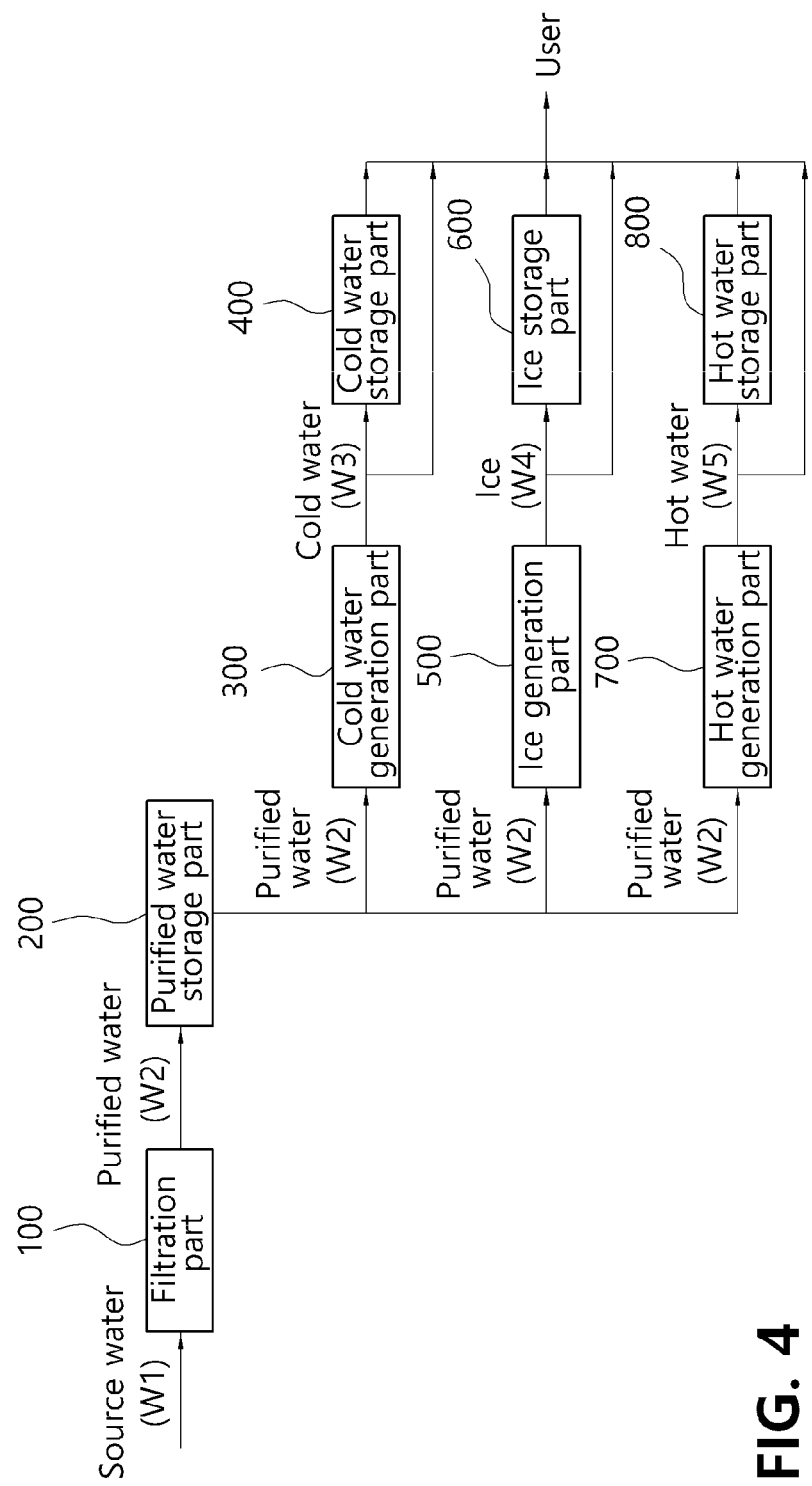
FIG. 4 is a flowchart illustrating a state in which source water supplied to the water purifier with an ice maker according to an exemplary embodiment of the present invention is treated and provided to a user.

Hereinafter, the water purifier with an ice maker according to the present invention will be described with reference to the drawings. FIG. 1 is a perspective view illustrating the water purifier with an ice maker according to an exemplary embodiment of the present invention as viewed from one direction, FIG. 2 is a perspective view illustrating the water purifier with an ice maker according to an exemplary embodiment of the present invention as viewed from another direction, FIG. 3 is a perspective view illustrating a state in which an ice generation part is mounted on the water purifier with an ice maker according to an exemplary embodiment of the present invention, and FIG. 4 is a flowchart illustrating a state in which source water supplied to the water purifier with an ice maker according to an exemplary embodiment of the present invention is treated and provided to a user. Herein, the x direction is the longitudinal direction of the water purifier with an ice maker, the y direction is the width direction of the water purifier with an ice maker, and the z direction is the height direction of the water purifier with an ice maker. Further, in order to clearly describe the present invention, parts that are irrelevant to the description are omitted from the drawings.

As illustrated in FIGS. 1 to 3, the water purifier with an ice maker according to an exemplary embodiment of the present invention includes a filtration part 100 for filtering source water (W1) to generate purified water (W2) and a purified water storage part 200 for storing purified water (W2) which is supplied from the filtration part 100. The filtration part 100 receives source water (W1) from the outside, and then filters the source water (W1) to generate purified water (W2). The filtration part 100 may include several filters. For example, the filtration part 100 may include a pre-carbon filter, a membrane filter and an after-carbon filter. In addition, the filtration part 100 may include an electric deionization-type filter. Electrodeionization refers to electrodeionization (EDI), continuous electrodeionization (CEDI), capacitive deionization (CDI) and the like. The purified water storage part 200 stores purified water (W2) supplied from the filtration part 100. The purified water (W2) stored in the purified water storage part 200 is provided to the user through a faucet or the like, or as illustrated in FIG. 4, it may be supplied to a cold water generation part 300, an ice generation part 500 and/or a hot water generation part 700 to be described below to be used to generate cold water (W3), ice (W4) and/or hot water (W5). Further, in some cases, the purified water storage part 200 may not be provided, and in this case, the purified water (W2) filtered through the filtration part 100 may be directly supplied to the cold water generation part 300, the ice generation part 500 and/or the hot water generation part 700. The hot water (W5) generated by the hot water generation part 700 may be stored in a separate hot water storage part 800.

As illustrated in FIG. 3, the water purifier with an ice maker according to an exemplary embodiment of the present invention further includes a cold water generation part 300 for receiving purified water (W2) from the filtration part 100 or the purified water storage part 200 to generate generates cold water (W3), and a cold water storage part 400 for storing cold water (W3) supplied from the cold water generation part 300. The cold water generation part 300 may be provided with a cooling coil member for cooling the purified water (W2), and a liquefied low-temperature and low-pressure refrigerant flows inside the cooling coil member to cool the purified water (W2), and the refrigerant which is vaporized while cooling the purified water (W2) is supplied to a compression member and circulates through a refrigerant passage. The cold water generation part 300 may be configured to be directly installed and fixed inside the cold water storage part 400 to cool the purified water (W2) supplied to the cold water storage part 400.

In addition, the water purifier with an ice maker according to an exemplary embodiment of the present invention further includes an ice generation part 500 for generating ice (W4) by receiving ice-making water, and an ice storage part 600 for storing ice (W4) supplied from the ice generation part 500. In order to supply ice-making water to the ice generation part 500, purified water (W2) supplied from the filtration part 100 or the purified water storage part 200 may be used as the ice-making water, or cold water (W3) supplied from the cold water generation part 300 or the cold water storage part 400 may be used as ice-making water. In addition, the meltwater generated by melting the ice (W4) accommodated in the ice storage part 600 may be used as ice-making water. That is, it is possible to be configured such that the meltwater is supplied to the ice generation part 500 from a separate collection tank in which the meltwater is accommodated, or the meltwater discharged from the ice storage part 600 is directly supplied to the ice generation part 500. As such, when cold water (W3) or meltwater is used as the ice-making water, the ice-making time for generating ice may be effectively shortened. Furthermore, cold water (W3) or meltwater is mainly used as the ice-making water, and if the amount of cold water (W3) or meltwater is insufficient, it is also possible to properly mix and use purified water (W2).

Figure 5:
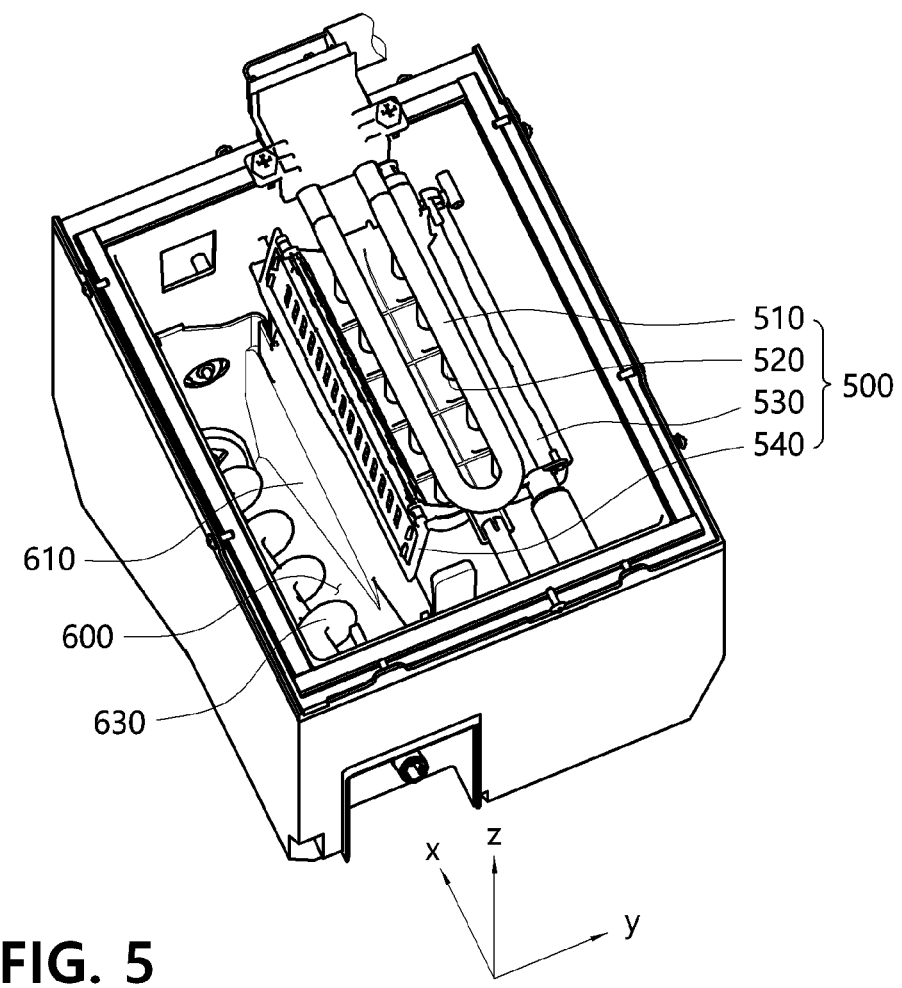
FIG. 5 is a perspective view illustrating the arrangement state of an ice generation part and an ice storage part mounted on the water purifier with an ice maker according to an exemplary embodiment of the present invention.

FIG. 5 is a perspective view illustrating the arrangement state of an ice generation part and an ice storage part mounted on the water purifier with an ice maker according to an exemplary embodiment of the present invention.

As illustrated in FIG. 5, the ice generation part 500 is provided with a finger member 520 for cooling ice-making water while being immersed in the ice-making water accommodated in a tray member 530, and such a finger member cools the ice-making water accommodated in the tray member 530 through a refrigerant. That is, when the refrigerant inside the finger member 520 evaporates and vaporizes, the ice-making water accommodated in the tray member 530 is cooled. As the ice-making water is cooled in this way, ice (W4) is generated inside the tray member 530, and the generated ice (W4) is suspended on the finger member 520. In addition, the ice generation part 500 is provided with a body member 510 for guiding the refrigerant to the finger member 520. The body member 510 is connected to the finger member 520 from the upper side of the finger member 520 to guide the refrigerant to the finger member 520, and the refrigerant provides cooling and heating necessary for ice generation while repeating compression, condensation, expansion and evaporation processes. In addition, the tray member 530 is provided with a guide member 540 for guiding the generated ice (W4) to the ice storage part 600.

The ice storage part 600 receives and stores the ice (W4) generated by the ice generation part 500. The ice storage part 600 is provided with a sidewall member 610 for partitioning an internal space of the ice storage part 600 to prevent the stored ice from escaping, and a screw member 630 for providing ice to the user. The screw member 630 is provided with a separate driving motor and is rotatably installed, and as the screw member 630 rotates, the ice (W4) stored in the ice storage part 600 is provided to the user through a separate discharge door.

Figure 6:
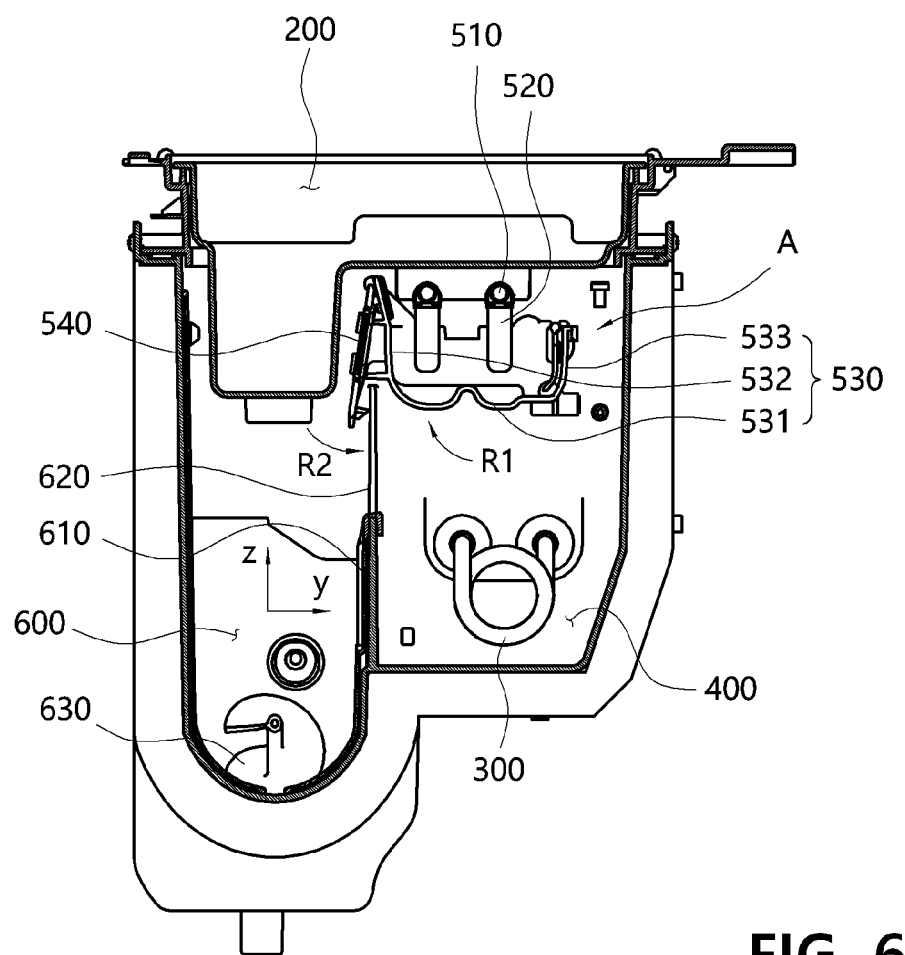
FIG. 6 is a cross-sectional view illustrating a state in which a tray member mounted on the water purifier with an ice maker according to an exemplary embodiment of the present invention is moved to an ice generating position.
Figure 7:
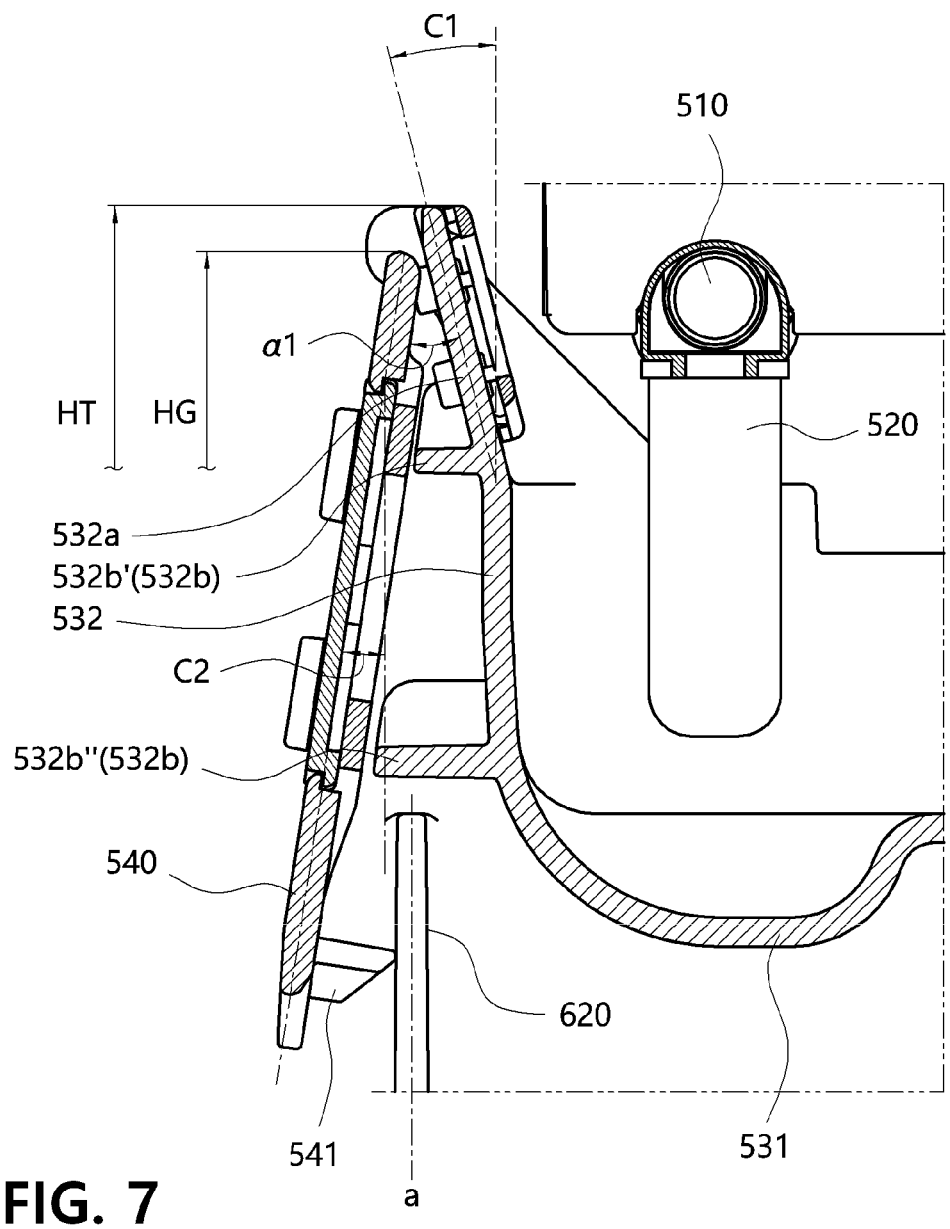
FIG. 7 is an enlarged cross-sectional view illustrating the arrangement state of the tray member and the guide member of FIG. 6.
Figure 8:
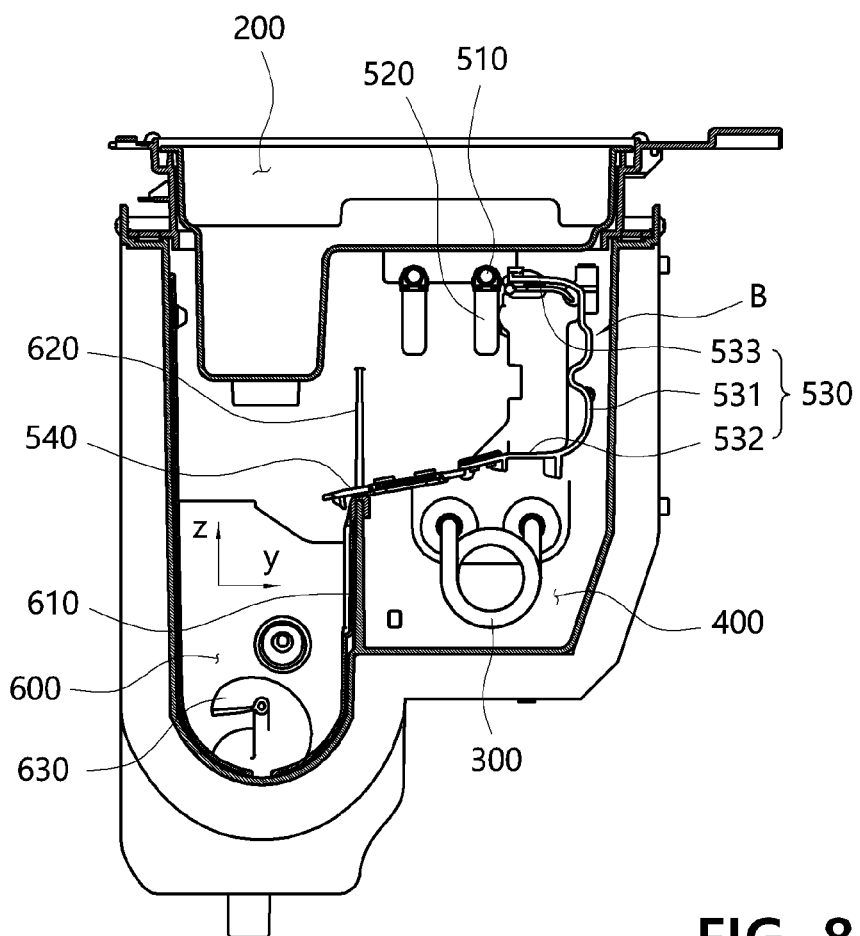
FIG. 8 is a cross-sectional view illustrating a state in which the tray member mounted on the water purifier with an ice maker according to an exemplary embodiment of the present invention is moved to an ice discharging position.
Figure 9:
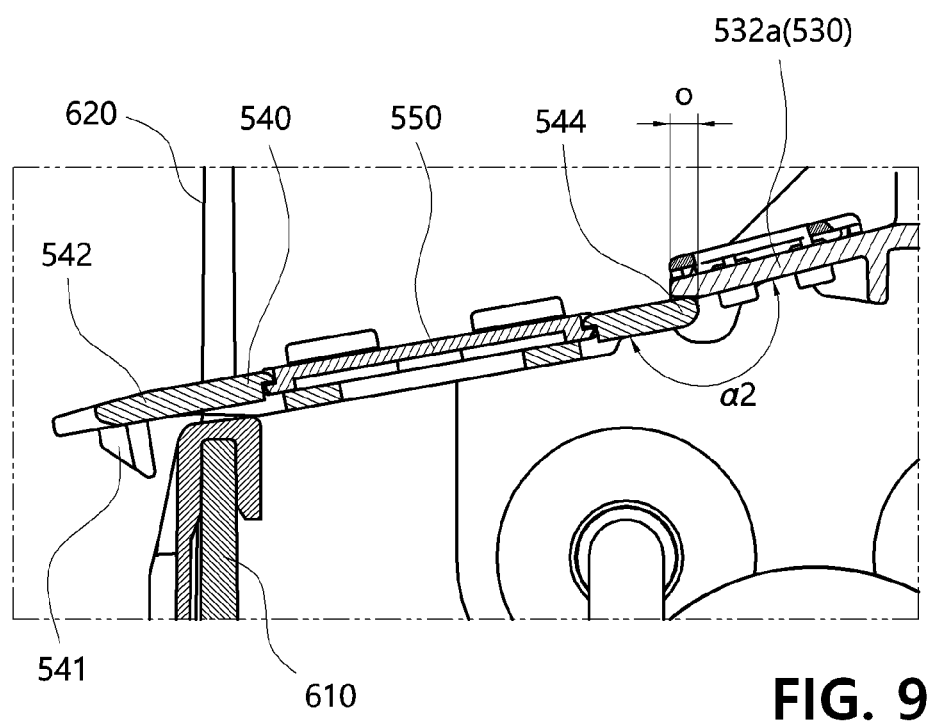
FIG. 9 is an enlarged cross-sectional view illustrating the arrangement state of the tray member and the guide member of FIG. 8.

FIG. 6 is a cross-sectional view illustrating a state in which a tray member mounted on the water purifier with an ice maker according to an exemplary embodiment of the present invention is moved to an ice generating position, FIG. 7 is an enlarged cross-sectional view illustrating the arrangement state of the tray member and the guide member of FIG. 6, FIG. 8 is a cross-sectional view illustrating a state in which the tray member mounted on the water purifier with an ice maker according to an exemplary embodiment of the present invention is moved to an ice discharging position, and FIG. 9 is an enlarged cross-sectional view illustrating the arrangement state of the tray member and the guide member of FIG. 8.

The tray member 530 according to an exemplary embodiment of the present invention rotates between a first position (A) where ice (W4) is generated by receiving ice-making water and a second position (B) where the generated ice (W4) is separated. A driving motor may be further provided to implement such rotation. As illustrated in FIGS. 6 and 7, the first position (A) is a position where ice-making water is supplied to the tray member 530 and ice (W4) is generated. As illustrated in FIGS. 8 and 9, the second position (B) is a position where the generated ice (W4) and the ice-making water remaining inside the tray member 530 are discharged to the outside of the tray member 530. When the tray member 530 rotates from the first position (A) to the second position (B), the ice (W4) generated in the finger member 520 is separated from the finger member 520. A high-temperature fluid may be instantaneously supplied to the inside of the finger member 520 through the tray member 530 such that the ice (W4) suspended on the finger member 520 may be easily separated. The ice (W4) separated from the finger member 520 in this way is guided by the guide member 540 to move to the ice storage part 600, and at the same time, the ice-making water remaining inside the tray member 530 may be discharged to the outside of the tray member 530. When the tray member 530 is positioned at the second position (B) and all of the ice (W4) and the remaining ice-making water are discharged, the tray member 530 rotates back to the first position (A). In this case, as illustrated in FIG. 6, when the tray member 530 rotates in one direction (R1) to move from the second position (B) to the first position (A), the guide member 540 rotates in the other direction (R2), and as illustrated in FIG. 7, the uppermost height (HG) of the guide member 540 in a state where the tray member 530 is moved to the first position (A) may be disposed to be identical to the uppermost height (HT) of the tray member 530, or the uppermost height (HG) of the guide member 540 may be disposed to be lower than the uppermost height (HT) of the tray member 530. In this configuration, when the guide member 540 is directly connected to the tray member 530, the ice (W4) separated while the tray member 530 moves to the second position (B) may be stably moved to the ice storage part 600, and even if the tray member 530 moves to the first position (A), the guide member 540 directly connected to the tray member 530 does not interfere with the purified water storage part 200 which is disposed on the top of the ice generation part 500, and thus, it is possible to increase the capacity of the purified water storage part 200, thereby improving user convenience.

When the tray member 530 according to an exemplary embodiment of the present invention is positioned at the first position (A) as illustrated in FIG. 7, a first angle (α1) which is formed between the tray member 530 and the guide member 540 is formed to be smaller than a second angle (α2) which is formed between the tray member 530 and the guide member 540, when the tray member 530 is positioned at the second position (B) as illustrated in FIG. 9. That is, when the tray member 530 is positioned at the first position (A), the space formed between the tray member 530 and the guide member 540 is minimized to prevent interference with the purified water storage part 200 from occurring, and when the tray member 530 is rotated to the second position (B), the space formed between the tray member 530 and the guide member 540 expands, and the ice (W4) separated through the guide member 540 may stably move to the ice storage part 600.

As described above, when the tray member 530 rotates in one direction (R1) to move from the second position (B) to the first position (A), the guide member 540 rotates in the other direction (R2), and in this way, since the guide member 540 rotates by gravity, it rotates stably even without a separate power source, thereby preventing interference with the purified water storage part 200 at the ice generating position, and enables the ice (W4) to move stably at the ice discharging position, thereby ensuring operational stability of the water purifier with an ice maker and improving power consumption efficiency. The guide member 540 is connected to the tray member 530 in a loose fitting manner such that the guide member 540 is rotatable by gravity.

As illustrated in FIGS. 8 and 9, the ice storage part 600 is provided with a sidewall member 610 for preventing the supplied ice (W4) from escaping. The sidewall member 610 not only prevents the ice (W4) from escaping, but also partitions the respective internal spaces such that the cold water (W3) stored in the cold water storage 400 and the ice (W4) stored in the ice storage 600 are not mixed. In addition, when the tray member 530 is positioned at the second position (B), one side of the guide member 540 is connected to the tray member 530, and the other side of the guide member 540 is seated on the upper end of the sidewall member 610, and thus, it is possible for the separated ice (W4) to stably move. In this case, when the tray member 530 is positioned at the first position (A), the other side of the guide member 540 is disposed on the inner side in the width direction (y) of the ice storage part 600 rather than the extension line (a) of the sidewall member 610. Herein, the inner side in the width direction (y) of the ice storage part 600 refers to a space in which the screw member 630 is disposed. That is, when the tray member 530 is positioned at the first position (A), if the tray member 530 rotates to the second position (b) in a state where the other side of the guide member 540 is disposed on the inner side in the width direction y of the ice storage part 600 rather than the extension line (a) of the sidewall member 610, the height of the guide member 540 is lowered along the height direction (z). In this way, in the process of lowering the height of the guide member 540, the other side of the guide member 540 is seated on the top of the sidewall member 610, and as this state is maintained until the tray member 530 moves to the second position (B), the ice (W4) separated thereafter is stably moved to the ice storage part 600.

As illustrated in FIG. 6, the tray member 530 according to an exemplary embodiment of the present invention is formed with a base 531, a first sidewall 532 that extends upwardly from the base 531 to accommodate the ice-making water and is connected to the guide member 540 and a second sidewall 533 which is disposed opposite to the first sidewall 532. A separate ice-making water supply passage through which ice-making water is supplied may be formed in the tray member 530, and the supplied ice-making water is accommodated in the space between the base 531 and the first sidewall 532 and the second sidewall 533 disposed to face each other. In this case, as illustrated in FIG. 7, an auxiliary sidewall 532a to which one side of the guide member 540 is connected is formed on the first sidewall 532 to extend upward, and a first slope (C1) is formed on the auxiliary sidewall 532a toward the inner side in the width direction (y) of the ice storage part 600. In this way, the auxiliary sidewall 532a on which the first slope (C1) is formed is formed to be extended, and when one side of the guide member 540 is connected to the auxiliary sidewall 532a, the other side of the guide member 540 may be stably seated on the top of the sidewall member 610 in the process of the tray member 530 rotating to the second position (B).

Alternatively, an auxiliary sidewall 532a to which one side of the guide member 540 is connected is extended upwardly from the first sidewall 532, and a separate slope is not formed on the auxiliary sidewall 532a, and it is also possible that the guide member 540 forms a slope toward the inner side in the width direction (y) of the ice storage part 600. That is, as illustrated in FIG. 6, when the tray member 530 is positioned at the first position (A), a second slope (C2) is formed on the guide member 540 such that the other side of the guide member 540 faces the inner side in the width direction (y) of the ice storage part 600. To this end, a supporting sidewall 532b is formed on the outer peripheral surface of the first sidewall 532 to support the guide member 540 such that the second slope (C2) is formed. When the supporting sidewall 532b is formed in this way, the other side of the guide member 540 is disposed on the inner side in the width direction (y) of the ice storage part 600, and the other side of the guide member 540 may be stably seated on the top of the sidewall member 610 in the process of the trey member 530 rotating to the second position (B).

The supporting sidewall 532b is formed to extend along the inner side in the width direction (y) of the ice storage part 600, and is formed in plurality along the extension direction of the first sidewall 532 to stably support such that a second slope (C2) is formed on the guide member 540. In this case, the supporting sidewall 532b includes a first supporting sidewall 532b' formed at an upper portion along the height direction (z), and a second supporting sidewall 532b" formed at a lower portion, and the second supporting sidewall 532b" may be formed to extend longer than the first supporting sidewall 532b'. That is, when deformation to be disposed adjacent to the first sidewall occurs as the other side of the guide member 540 is twisted in the process of using the water purifier with an ice maker, problems may occur in that when the tray member 530 rotates, the other side of the guide member 540 is not seated on the top of the sidewall member 610, and is separated from the top of the sidewall member 610, and when the second supporting sidewall 532b" is formed to have a longer length than the first supporting sidewall 532b' in this way, the second slope (C2) is stably formed such that when the tray member 530 rotates, the other side of the guide member 540 may be stably seated on the top of the sidewall member 610.

As illustrated in FIG. 7, in the ice storage part 600 according to an exemplary embodiment of the present invention, a rail member 620 is formed to extend along the extension line (a) of the sidewall member 610, and the guide member 540 is formed with a support protrusion 541 to support such that when the tray member 530 is positioned at the first position (A), the other side of the guide member 540 is disposed on the inner side in the width direction (y) of the ice storage part 600 rather than the extension line (a) of the sidewall member 610. That is, as the support protrusion 541 formed on the guide member 540 in the process of the tray member 530 rotating from the first position (A) to the second position (B) is supported by the rail member 620, the guide member 540 may be stably seated on the top of the sidewall member 610 without being separated from the sidewall member 610.

Figure 10:
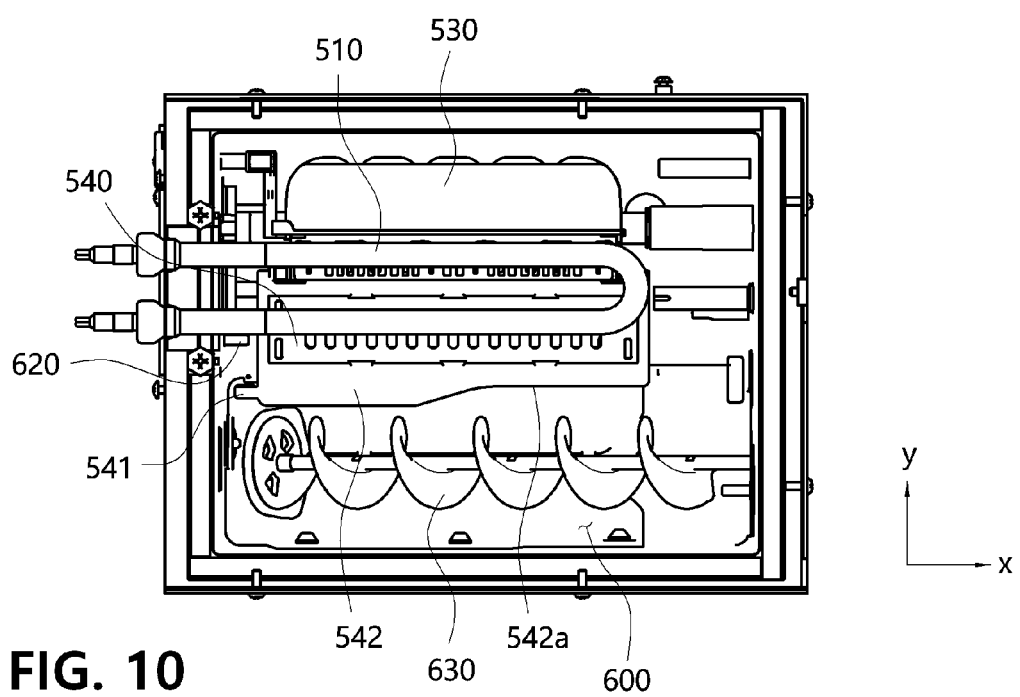
FIG. 10 is a plan view illustrating the arrangement state of a guide member and a screw member mounted on the water purifier with an ice maker according to an exemplary embodiment of the present invention.

FIG. 10 is a plan view illustrating the arrangement state of a guide member and a screw member mounted on the water purifier with an ice maker according to an exemplary embodiment of the present invention.

As illustrated in FIG. 10, when the tray member 530 is positioned at the second position (B) on the other side of the guide member 540 according to an exemplary embodiment of the present invention, an auxiliary support surface 542 extending to be disposed on the inner side in the width direction (y) of the ice storage part 600 rather than the sidewall member 610 is formed such that the separated ice (W4) may stably move to the ice storage part 600. In this case, as described above, the ice storage part 600 is provided with a screw member 630 for moving the stored ice (W4), and the screw member 630 moves along the slope of the bottom surface of the ice storage part 600 such that the front end is disposed to be higher than the rear end. Accordingly, the separation distance between the screw member 630 and the auxiliary support surface 542 is decreased from the rear end to the front end of the screw member 630 due to the inclined arrangement of the screw member 630 as described above. Accordingly, ice (W4) may not be normally supplied at a position adjacent to the front end of the screw member 630, but an ice moving groove 542a is formed on the auxiliary support surface 542 according to an exemplary embodiment of the present invention at a position adjacent to the front end of the screw member 630 such that ice is smoothly supplied even to a position adjacent to the front end of the screw member 630, and accordingly, the degree of dispersion of the ice (W4) may be improved.

Figure 11:
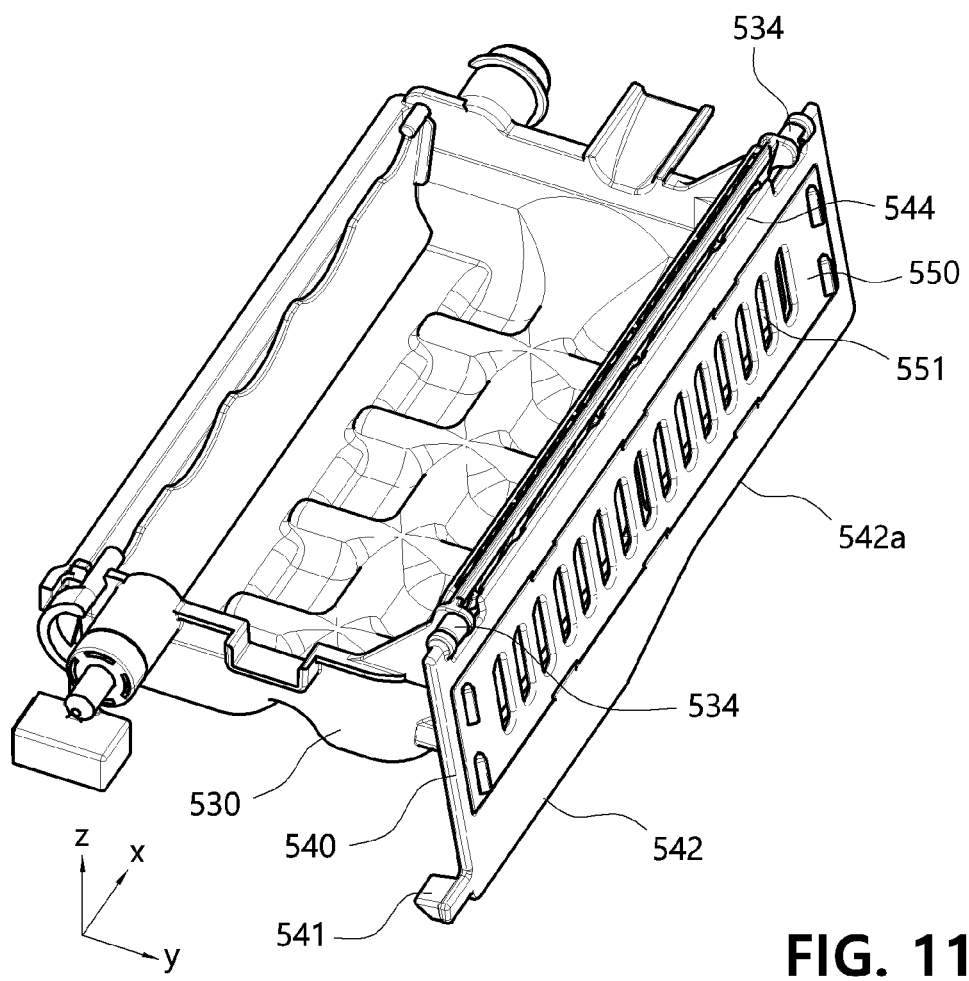
FIG. 11 is a perspective view illustrating a state in which a tray member and a guide member of the water purifier with an ice maker according to an exemplary embodiment of the present invention are combined.
Figure 12:
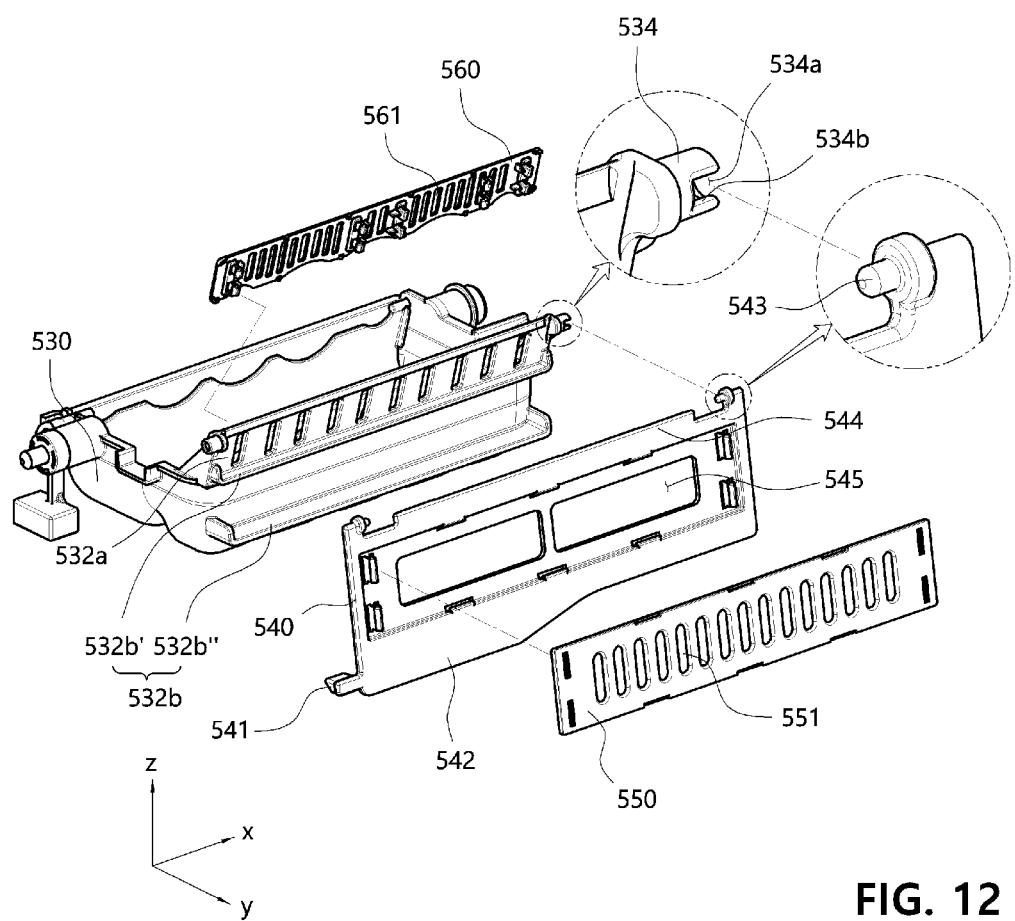
FIG. 12 is an exploded perspective view of a tray member and a guide member of the water purifier with an ice maker according to an exemplary embodiment of the present invention.

FIG. 11 is a perspective view illustrating a state in which a tray member and a guide member of the water purifier with an ice maker according to an exemplary embodiment of the present invention are combined, and FIG. 12 is an exploded perspective view of a tray member and a guide member of the water purifier with an ice maker according to an exemplary embodiment of the present invention.

As illustrated in FIGS. 11 and 12, a hinge shaft 543 is formed on one side of the guide member 540 according to an exemplary embodiment of the present invention, and the tray member 530 is formed with a coupling protrusion 534 having an insertion groove 534a formed therein such that the hinge shaft 543 is inserted, and the coupling protrusion 534 is formed with a separation slit 534b such that the separation of the hinge shaft 543 is possible. As the separation slit 534b is formed in this way, the coupling protrusion 534 may be elastically deformed in the process of inserting or separating the hinge shaft 543, thereby separating the guide member 540 from the tray member 530. The user may separate and wash the guide member 540 or replace the deformed guide member 540. In this case, as described above, the guide member 540 is connected to the tray member 530 in a loose fitting manner such that the guide member 540 is rotatable by gravity, and to this end, based on a state where the hinge shaft 543 is inserted into the coupling protrusion 534, the outer peripheral surface of the hinge shaft 543 and the inner circumferential surface of the coupling protrusion 534 are disposed to be spaced apart from each other by a predetermined distance.

As illustrated in FIG. 8, an overlap surface 544 is formed on one side of the guide member 540 according to an exemplary embodiment of the present invention such that when the tray member 530 is positioned at the second position (B), the guide member 540 and the tray member 530 overlap each other. In particular, since the overlap surface 544 of the guide member 540 is disposed under the tray member 530, the separated ice (W4) may move smoothly without being caught in the guide member 540.

As illustrated in FIG. 11, the guide member 540 may be provided with a buffer member 550 for reducing the falling impact of the ice (W4), and this buffer member 550 may be formed of a flexible material in order to maximize the buffering effect. In this case, as illustrated in FIG. 12, a first discharge hole 545 and a second discharge hole 551 through which the remaining ice-making water is discharged are respectively formed in the guide member 540 and the buffer member 550, and the first discharge hole 545 may be formed to be larger than the second discharge hole 551. That is, as the first discharge hole 545 formed in the guide member 540 is formed to be larger than the second discharge hole 551 formed in the buffer member 550, a portion in which the second discharge hole 551 is not formed in the buffer member is also disposed to overlap (o) first discharge hole 545, and in other words, since this portion is a portion that is not supported by the guide member 540, the buffer member 550 is elastically deformed to effectively reduce the falling noise of ice (W4) when the ice (W4) falls on this portion. In addition, a buffer member 560 is also provided on the auxiliary sidewall 532a to reduce the falling noise of ice (W4), and a discharge hole 561 is also formed in the buffer member 560 such that when the ice (W4) is discharged, the ice-making water remaining inside the tray member 530 may be discharged.

As described above, the guide member 540 for guiding the ice (W4) is configured to rotate and move together with the tray member 530 so as to stably guiding the separated ice (W4), and even when the tray member 530 rotates to the first position (A) which is the ice generating position, the guide member 540 does not interfere with the purified water storage part 200 such that it is possible to increase the capacity of the purified water storage part 200, thereby improving user convenience.

Although exemplary embodiments of the present invention have been described above, the spirit of the present invention is not limited to the exemplary embodiments presented in the present specification, and those skilled in the art who understand the spirit of the present invention will be able to easily propose other exemplary embodiments by supplementing, changing, deleting, or adding components within the scope of the same spirit, but it will be said that these are also within the scope of the spirit of the present invention.

| [Explanation of Reference Numerals] | |
|---|---|
| 100: Filtration part | 200: Purified water storage part |
| 300: Cold water generation part | 400: Cold water storage part |
| 500: Ice generation part | 510: Body member |
| 520: Finger member | 530: Tray member |
| 531: Base | 532: First sidewall |
| 532a: Auxiliary sidewall | 532b: Supporting sidewall |
| 532b': First supporting sidewall | 532b'': Second supporting sidewall |
| 533: Second sidewall | 534: Coupling protrusion |
| 534a: Insertion groove | 534b: Separation slit |
| 540: Guide member | 541: Support protrusion |
| 542: Auxiliary support surface | 542a: Ice moving groove |
| 543: Hinge shaft | 544: Overlapping surface |
| 545: First discharge hole | 550: Buffer member |
| 551: Second discharge hole | 560: Buffer member |
| 561: Discharge hole | 600: Ice storage part |
| 610: Sidewall member | 620: Rail member |
| 630: Screw member | 700: Hot water generation part |
| 800: Hot water storage part | |
| A: First position | B: Second position |
| C1: First slope | C2: Second slope |
| HG: Height of the top of guide member | |
| HT: Height of the top of tray member | |
| R1: Rotation in one direction | R2: Rotation in the other direction |
| W1: Source water | W2: Purified water |
| W3: Cold water | W4: Ice |
| W5: Hot water | |
| a: Extension line of sidewall member | o: Overlap |
| x: Longitudinal direction | y: Width direction |
| z: Height direction | |
| α1: First angle | α2: Second angle |

The invention claimed is:

1. A water purifier with an ice maker, comprising: a filtration part for filtering source water to produce purified water; a purified water storage part for storing the purified water supplied from the filtration part; a cold water generation part for generating cold water by receiving the purified water from the filtration part or the purified water storage part; a cold water storage part for storing cold water supplied from the cold water generation part; an ice generation part provided with a body member which is supplied with a low-temperature refrigerant to generate ice by receiving ice-making water, a finger member which is formed to extend from the body member, a tray member which accommodates the purified water in which the finger member is immersed, and a guide member which is connected to the tray member and guides generated ice; and an ice storage part for storing the generated ice supplied from the ice generating part, wherein the tray member rotates between a first position where the ice-making water is accommodated to generate ice and a second position where the generated ice is separated, wherein the guide member connects the tray member and the ice storage part to guide the generated ice to the ice storage part when the tray member is positioned at the second position, wherein when the tray member rotates in one direction to move from the second position to the first position, the guide member rotates in other direction such that an uppermost height of the guide member is arranged to be formed to be equal to or lower than an uppermost height of the tray member, wherein the ice storage part is provided with a sidewall member for preventing a supplied ice from escaping, wherein when the tray member is positioned at the second position, one side of the guide member is connected to the tray member, and other side of the guide member is seated on an upper end of the sidewall member, and wherein when the tray member is positioned at the first position, the other side of the guide member is disposed on an inner side in a width direction of the ice storage part rather than an extension line of the sidewall member.

2. The water purifier of claim 1, wherein a first angle formed between the tray member and the guide member when the tray member is positioned at the first position is formed to be smaller than a second angle formed between the tray member and the guide member when the tray member is positioned at the second position.

3. The water purifier of claim 1, wherein when the tray member rotates in the one direction, the guide member rotates in the other direction by gravity.

4. The water purifier of claim 1, wherein the tray member is formed with a base, a first sidewall which extends upward from the base so as to accommodate the ice-making water and is connected to the guide member, and a second sidewall which is disposed to face the first sidewall, wherein an auxiliary sidewall to which the one side of the guide member is connected is formed to extend upward on the first sidewall, and wherein a first slope toward the inner side in the width direction of the ice storage part is formed on the auxiliary sidewall.

5. The water purifier of claim 1, wherein the tray member is formed with a base, a first sidewall which extends upward from the base so as to accommodate the ice-making water and is connected to the guide member, and a second sidewall which is disposed to face the first sidewall, wherein an auxiliary sidewall to which one side of the guide member is connected is formed to extend upward on the first sidewall, and wherein a supporting sidewall for supporting the guide member is formed on an outer peripheral surface of the first sidewall such that a second slope toward the inner side in the width direction of the ice storage part is formed on the guide member when the tray member is positioned at the first position.

6. The water purifier of claim 5, wherein the supporting sidewall is formed to extend along the inner side in the width direction of the ice storage part, and is formed in plurality along an extension direction of the first sidewall.

7. The water purifier of claim 6, wherein the supporting sidewall comprises a first supporting sidewall formed at an upper part and a second supporting sidewall formed at a lower part, and
wherein the second supporting sidewall is formed to extend longer than the first supporting sidewall.

8. The water purifier of claim 1, wherein a rail member is formed to extend along the extension line of the sidewall member in the ice storage part, and
wherein a support protrusion is formed on the guide member to support such that the other side of the guide member is disposed on the inner side in the width direction of the ice storage part rather than the extension line of the sidewall member when the tray member is positioned at the first position.

9. The water purifier of claim 1, wherein an auxiliary support surface extending to be disposed on the inner side in the width direction of the ice storage part rather than the sidewall member is formed on the other side of the guide member when the tray member is positioned at the second position.

10. The water purifier of claim 9, wherein the ice storage part is provided with a screw member for moving the stored ice, wherein the screw member has a front end higher than a rear end, and
wherein an ice moving groove is formed on the auxiliary support surface at a position adjacent to the front end of the screw member.

11. The water purifier of claim 1, wherein a hinge shaft is formed on one side of the guide member, and a coupling protrusion having an insertion groove for inserting the hinge shaft is formed on the tray member, and
wherein a separation slit is formed in the coupling protrusion to enable separation of the hinge shaft.

12. The water purifier of claim 1, wherein an overlap surface is formed on one side of the guide member such that the guide member and the tray member overlap each other when the tray member is positioned at the second position.

13. The water purifier of claim 1, wherein the guide member is provided with a buffer member for reducing an impact of falling ice.

14. The water purifier of claim 13, wherein a first discharge hole and a second discharge hole through which remaining ice-making water is discharged are formed in the guide member and the buffer member, respectively, and
wherein the first discharge hole is formed to be larger than the second discharge hole.

15. The water purifier of claim 1, wherein when the tray member is positioned at the second position, the one side of the guide member is disposed outside of the ice storage part in the width direction compared with the extension line of the sidewall member.

* * * * *